United States Patent
Collingsworth

(10) Patent No.: US 12,515,939 B1
(45) Date of Patent: Jan. 6, 2026

(54) FLUID TRANSFER SYSTEM AND METHOD OF USE THERE

(71) Applicant: William Collingsworth, Apple Valley, CA (US)

(72) Inventor: William Collingsworth, Apple Valley, CA (US)

( * ) Notice: Subject to any disclaimer, the term of this patent is extended or adjusted under 35 U.S.C. 154(b) by 0 days.

(21) Appl. No.: 19/257,970

(22) Filed: Jul. 2, 2025

(51) Int. Cl.
  B60S 5/00 (2006.01)
  B67D 7/02 (2010.01)

(52) U.S. Cl.
  CPC ......... B67D 7/0277 (2013.01); B67D 7/0294 (2013.01); B60S 5/00 (2013.01)

(58) Field of Classification Search
  CPC ...... F01P 11/0204; F01P 11/0276; B60S 5/00; F01M 11/0458
  See application file for complete search history.

(56) References Cited

U.S. PATENT DOCUMENTS

| | | | |
|---|---|---|---|
| 8,590,580 B2 * | 11/2013 | Bedi | F01P 11/0276 141/98 |
| 12,360,001 B2 * | 7/2025 | Gabbey | B60S 5/00 |
| 2003/0230354 A1 * | 12/2003 | Roberts | F01P 11/0204 141/98 |
| 2005/0067048 A1 * | 3/2005 | Few | F01P 11/06 141/98 |

* cited by examiner

*Primary Examiner* — Timothy P. Kelly
(74) *Attorney, Agent, or Firm* — Innovent Law P.C.; Karima Gulick

(57) ABSTRACT

A fluid transfer system, including a liquid container to store a liquid therein, a first valve that facilitates movement of air therethrough, a second valve connected to the first valve and the liquid container to receive at least one of the liquid and the air therethrough, an air dispenser unit connected to the first valve and dispenses the air toward the first valve, and a vacuum generator connected to the first valve and the second valve, the vacuum generator to vacuum the air through the second valve, such that at least one of the liquid and the air moves through the second valve for extraction.

18 Claims, 6 Drawing Sheets

(Automation)

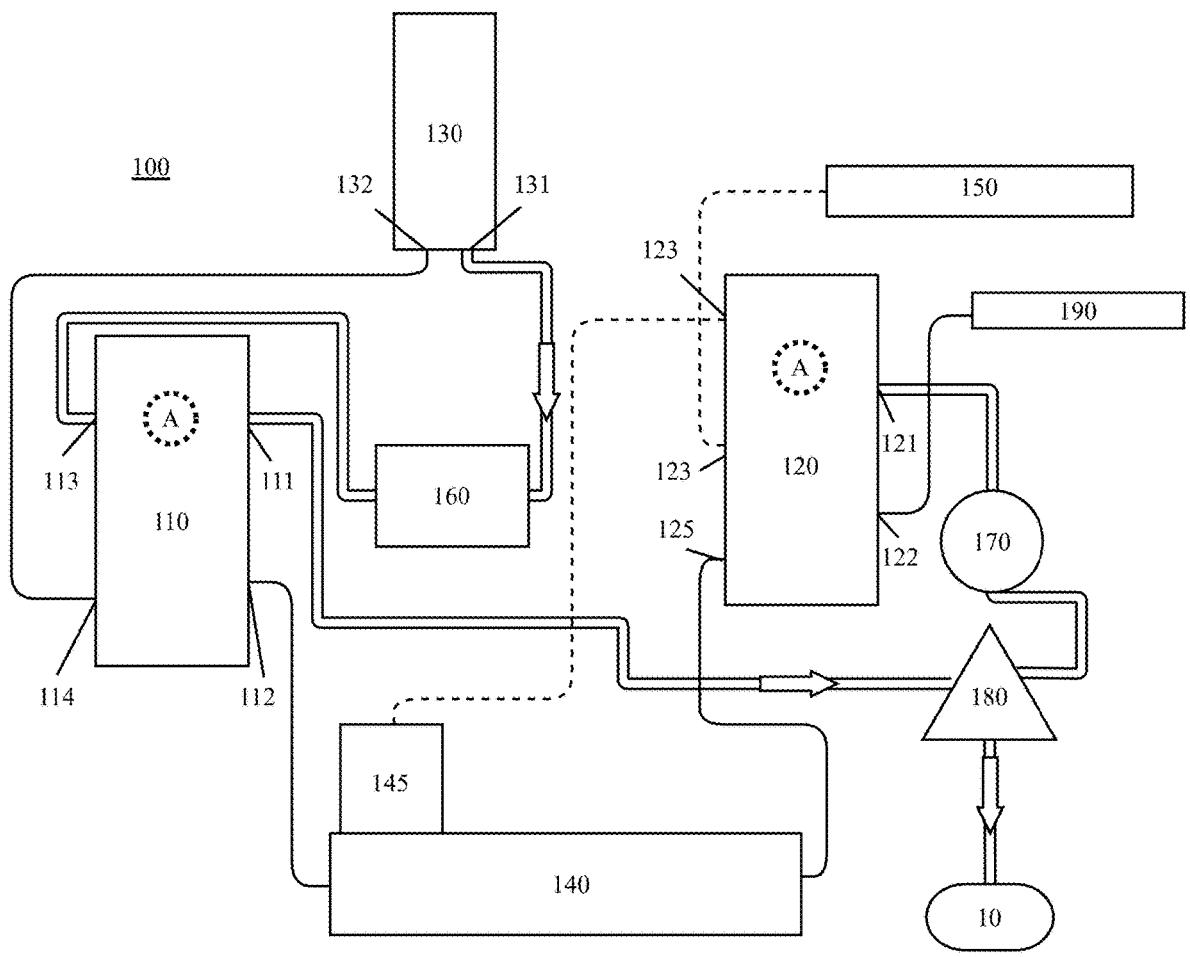
FIG. 1 (Pressure Build-Up)

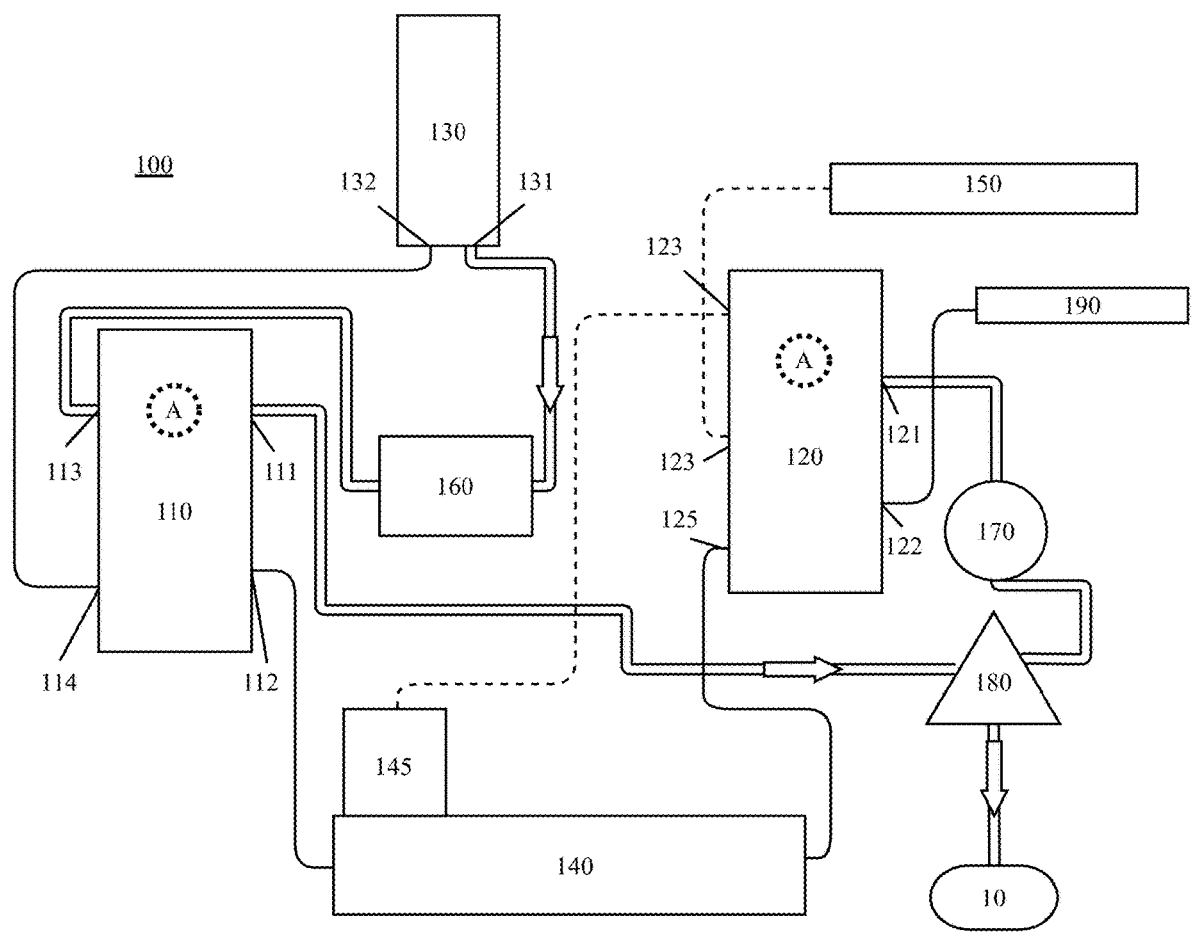
FIG. 2 (Pressure Leak Test)

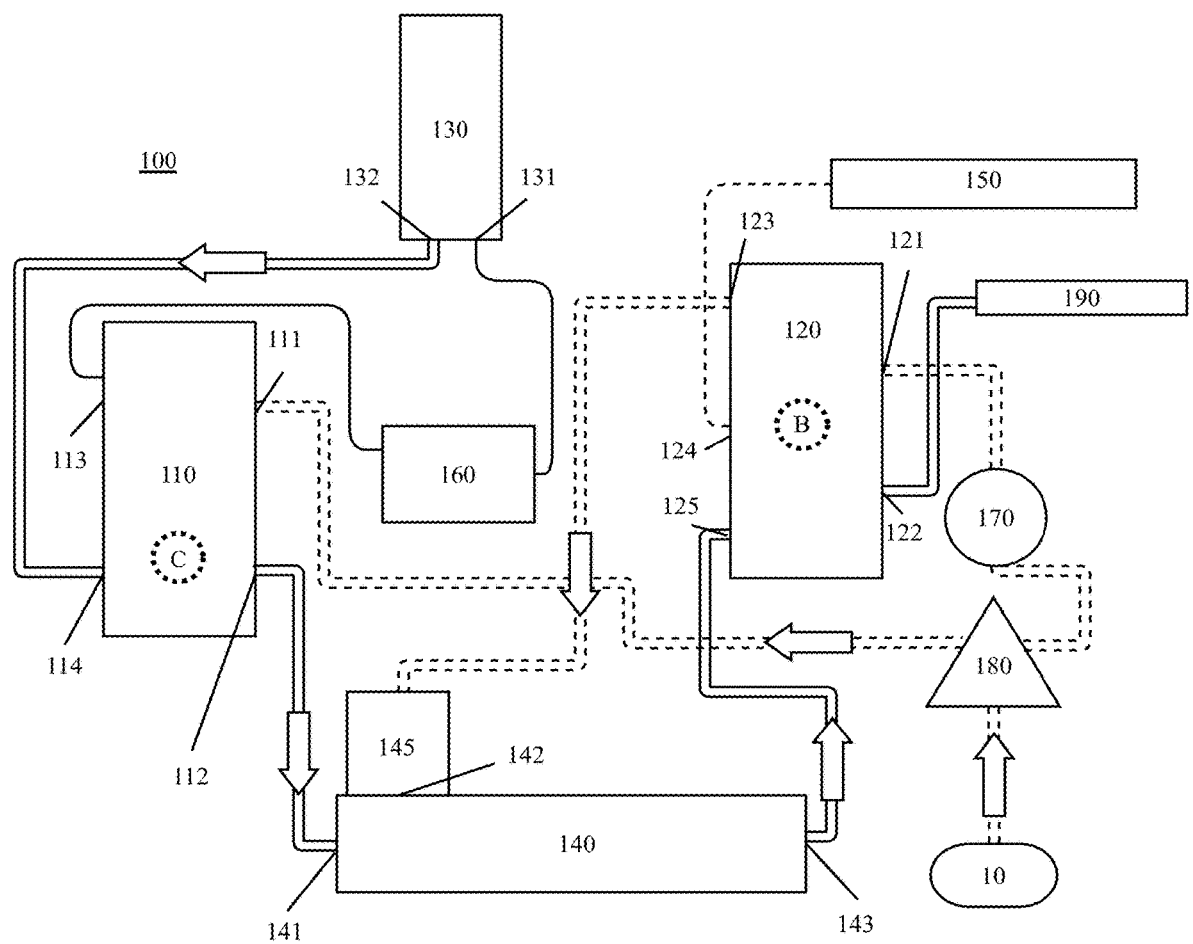
FIG. 3 (Vacuum Creation)

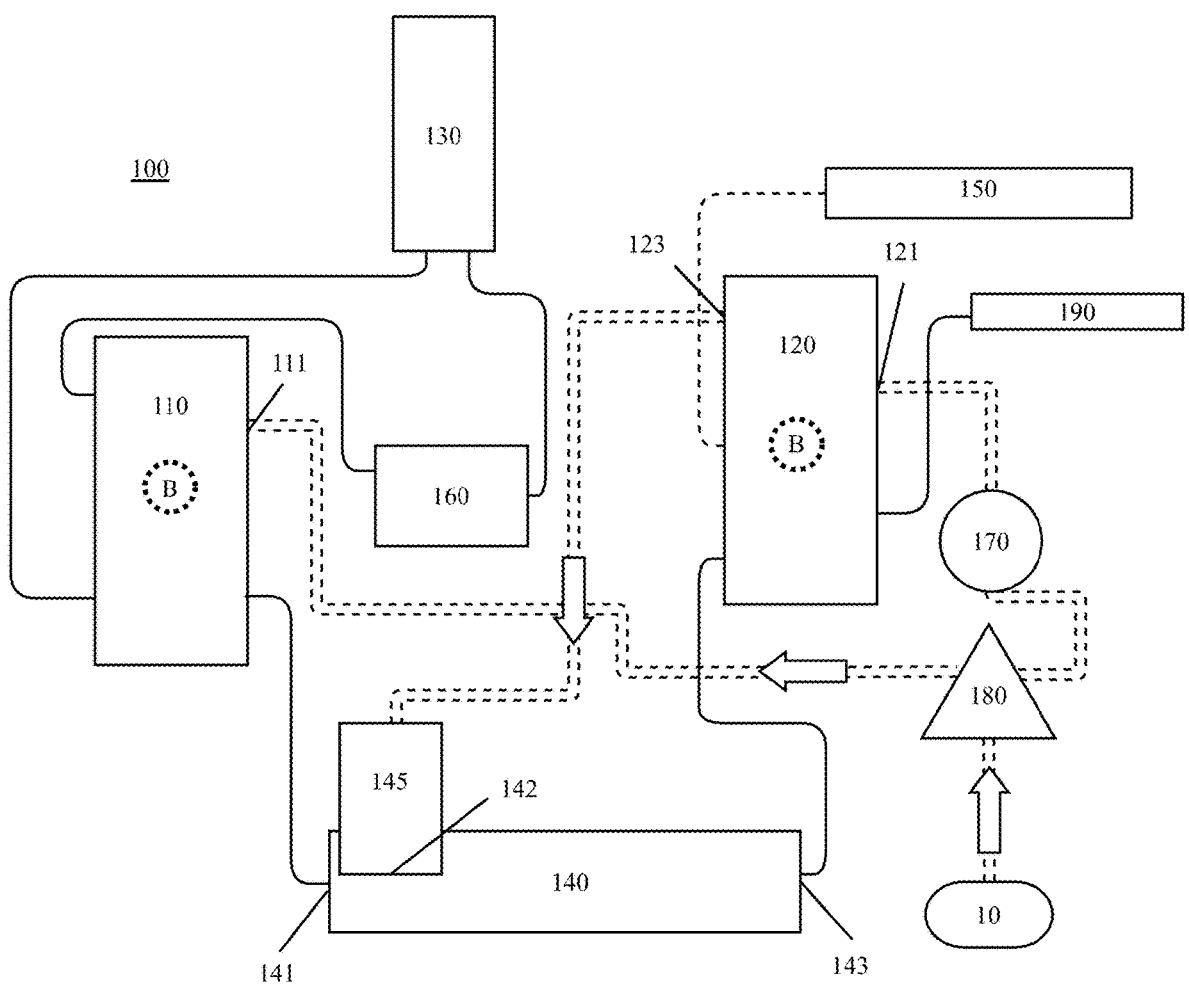
FIG. 4 (Vacuum Leak Test)

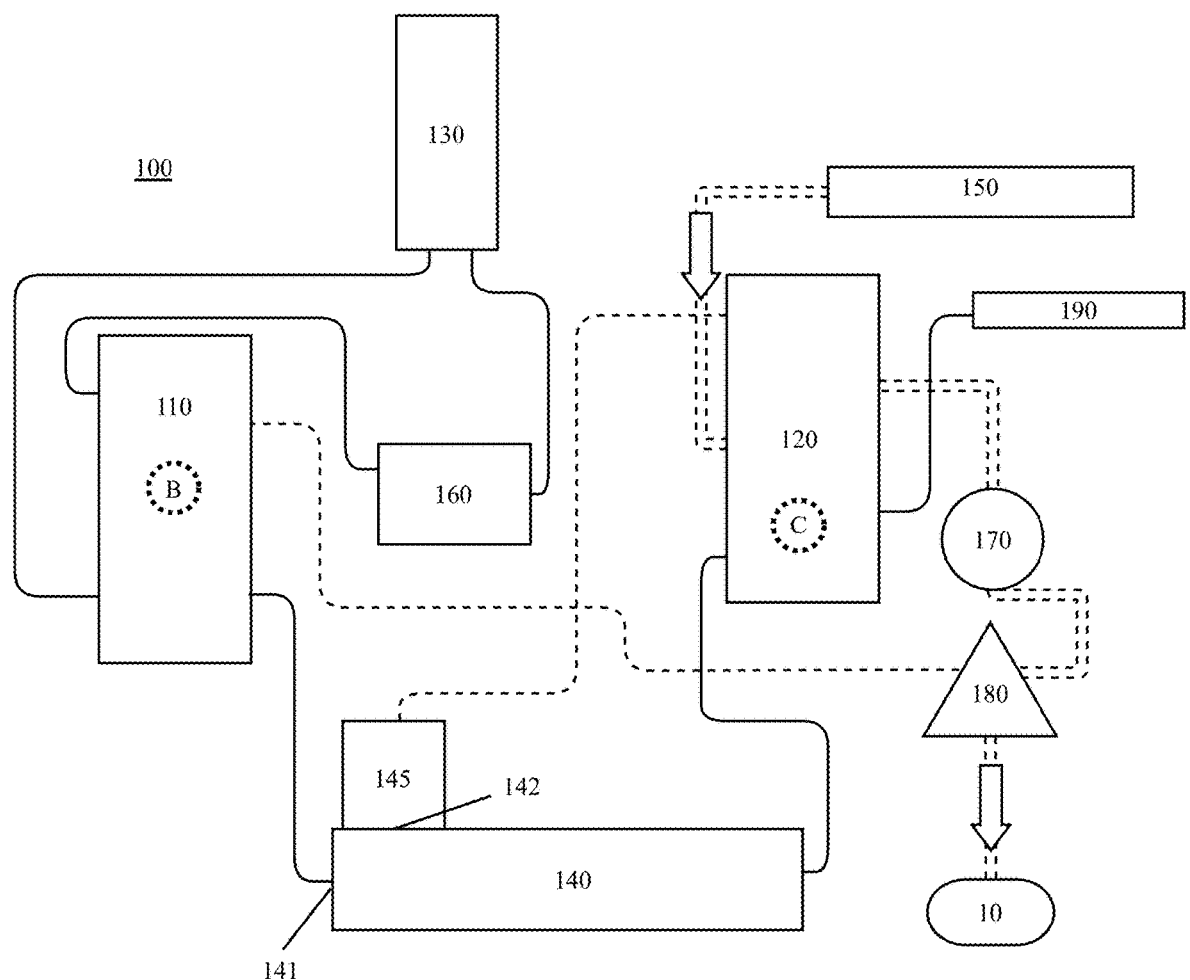
FIG. 5 (Refill)

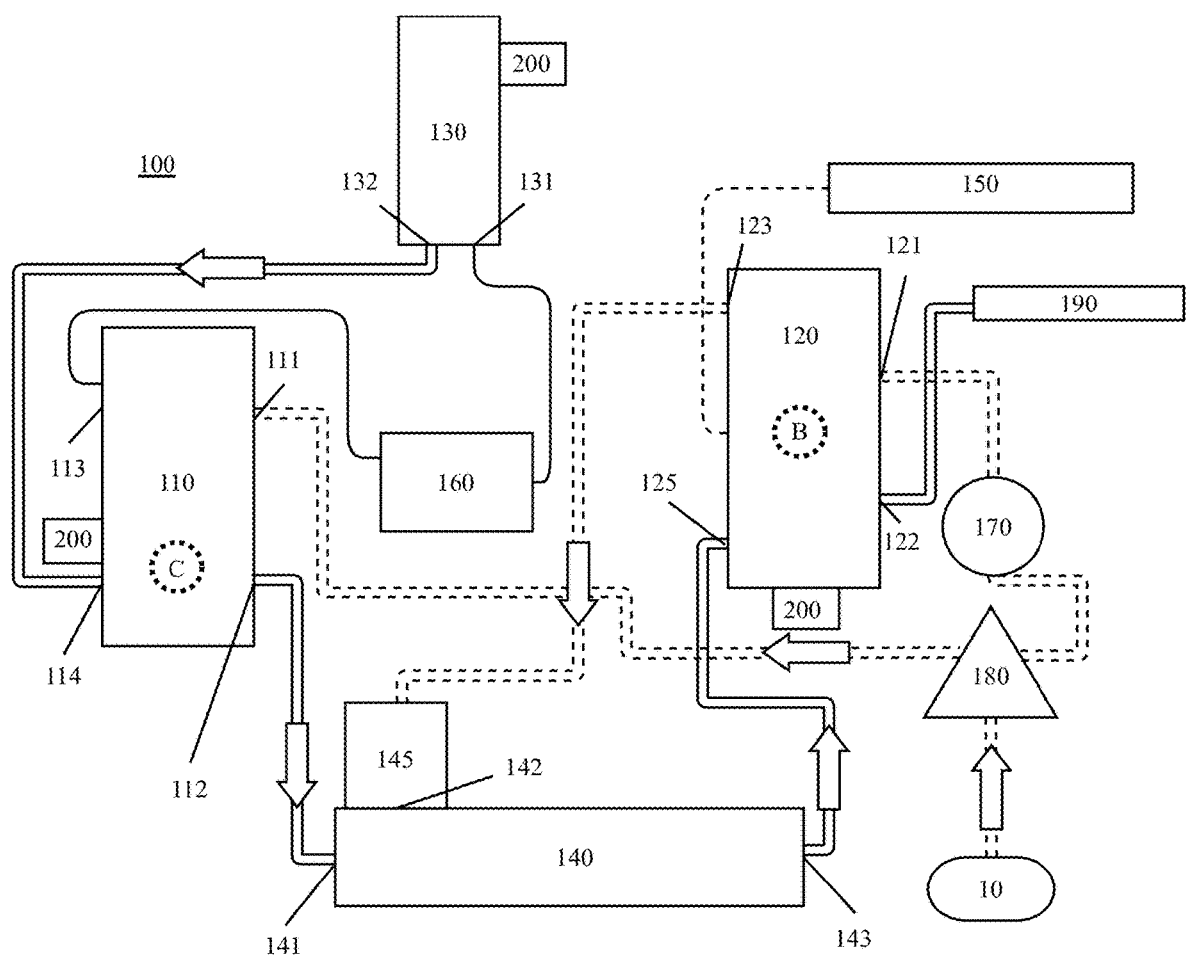
FIG. 6 (Automation)

FLUID TRANSFER SYSTEM AND METHOD OF USE THERE

BACKGROUND OF THE INVENTION

1. Field of the Invention

The present disclosure relates to a fluid transfer system and method of use thereof. More specially, the present disclosure relates to a fluid transfer system that 1) creates a vacuum using a vacuum generator, 2) drains the used coolant from cooling system using the vacuum in the vacuum generator, 3) creates a vacuum within the cooling system, and 4) transfer new coolant from a refresh coolant source to the cooling system using the newly created vacuum.

2. Description of the Related Art

Changing the cooling system coolant (also known as antifreeze) in your vehicle is an essential maintenance task to ensure your engine runs at optimal temperatures and to prevent overheating or freezing.

The mechanic has an option to change the cooling system coolant manually. Firstly, the old coolant must be drained from the cooling system. Conventionally, the mechanic should place a drain pan underneath the cooling system or engine block drain plug, open the cooling system cap slowly to release any remaining pressure, locate the cooling system drain plug (usually at the bottom of the cooling system) and unscrew it carefully to allow the coolant to drain into the pan. If the car has an engine block drain valve, the user should open it to drain any coolant trapped in the engine. The user should then wait a few minutes for coolant to drain completely.

Secondly, the mechanic can manually use a funnel to slowly add the new coolant mixture (typically a 50/50 mix of coolant and distilled water) into the cooling system, fill the overflow reservoir (if your vehicle has one) to the appropriate level, and finally close the cooling system cap securely.

However, the above-mentioned method of manually changing the cooling system coolant may introduce pockets of air in the cooling system, which can lead to overheating or inefficient cooling. Trapped air in the coolant vacuum systems leads to all kinds of problems, from overheating to erratic temperature readings, ECM (Engine Control Module) fault codes, and poor drivability. When a sealed cooling system gets trapped air, these pockets can get stuck in over sensors and other areas, wreaking havoc on the system. Getting these out of a sealed system requires lots of effort or driving and waiting.

The mechanic can also use a vacuum coolant filling method to change the cooling system coolant. The vacuum filler removes air from the system before filling it with coolant, ensuring a smooth and complete filling process. The vacuum coolant filling method involves the use of a compressor and airline to create a venturi effect to draw a vacuum on the cooling system.

The vacuum coolant filler 1) creates a vacuum, 2) drains the used coolant from cooling system using the vacuum, 3) creates a vacuum within the cooling system, and 4) transfer new coolant from a refresh coolant source to the cooling system using the newly created vacuum. However, the vacuum coolant filler on the market has separate pieces of equipment for each of the above-mentioned steps. After one step is complete, the mechanic must replace one equipment with another one before performing the next step. The change of equipment is not only time-consuming but also creates the risk of insecure connection.

Thus, there is a need for a coolant change system that avoids introducing air pocket in the cooling system during the coolant change process.

There is also a need for a coolant change system that does not involve the replacement of equipment during coolant change.

SUMMARY OF THE INVENTION

The present disclosure provides a fluid transfer system.

The foregoing and/or other features and utilities of the present disclosure may be achieved by providing a fluid transfer system, including a liquid container to store a liquid therein, a first valve that facilitates movement of air therethrough, a second valve connected to the first valve and the liquid container to receive at least one of the liquid and the air therethrough, an air dispenser unit connected to the first valve and dispenses the air toward the first valve, and a vacuum generator connected to the first valve and the second valve, the vacuum generator to vacuum the air through the second valve, such that at least one of the liquid and the air moves through the second valve for extraction.

The air dispenser unit at least partially dispenses the air to the vacuum generator and creates pressure for the vacuum generator.

The vacuum generator generates vacuum based on the air received from the air dispenser.

The fluid transfer system, further includes a check valve connected to the second valve and the vacuum generator to restrict movement of the air from the second valve into the vacuum generator.

The fluid transfer system, further includes a pressure regulator connected between the first valve and the air dispenser to regulate air pressure from the air dispenser.

The fluid transfer system, further includes a waste container connected to the second valve and stores waste generated and collected within the vacuum generator.

The liquid is extracted from the liquid container through the second valve in response to drawing the air into the vacuum generator.

The fluid transfer system, further includes a pressure gauge connected to the first valve and the second valve to display the air pressure at the connection between the pressure gauge, the first valve, and the second valve.

The fluid transfer system, further includes a tee connector connected between the first valve and the second valve, the tee connector facilitates connecting the first valve and the second valve to an external connector.

The fluid transfer system, further includes a control unit connected to the first valve, the second valve, the air dispenser unit, and the vacuum generator to automatically test the air pressure level moving through the first valve and the second valve, and extract the liquid from the liquid container toward an external connector in response to the air pressure level remaining steady.

The foregoing and/or other features and utilities of the present disclosure may also be achieved by providing a method, including storing a liquid within a liquid container, facilitating movement of air through a first valve, receiving at least one of the liquid and the air through a second valve connected to the first valve, dispensing the air toward the first valve from an air dispenser, and vacuuming, via a vacuum generator, the air through the second valve, such that at least one of the liquid and the air moves through the second valve for extraction.

Dispensing the air toward the first valve comprises at least partially dispensing the air to the vacuum generator and creating pressure for the vacuum generator.

Vacuuming the air through the second valve comprises generating the vacuum based on the air received from the air dispenser.

The method, further includes restricting, via a check valve, movement of the air from the second valve into the vacuum generator.

The method, further includes regulating, via a regulator, air pressure from the air dispenser.

The method, further includes storing, via a waste container, waste generated and collected within the vacuum generator.

Extracting the liquid from the second valve comprises extracting the liquid from the liquid container through the second valve in response to drawing the air into the vacuum generator.

Extracting the liquid from the liquid container includes dispensing the liquid toward an external connector, and preventing the air from moving from the external connector to the vacuum generator.

The method, further includes displaying, via a pressure gauge, the air pressure at the connection between the pressure gauge, the first valve, and the second valve.

The method, further includes connecting, via a tee connector, the first valve and the second valve to an external connector.

Before explaining the various embodiments of the invention in detail, it is to be understood that the invention is not limited in its application to the details of construction and to the arrangements of the components set forth in the following description or illustrated in the drawings. Rather, the invention is capable of other embodiments and of being practiced and carried out in various ways. Also, it is to be understood that the terminology employed herein is for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

For a better understanding of the invention, its operating advantages and the specific objects attained by its uses, reference should be made to the accompanying drawings and descriptive matter in which there are illustrated preferred embodiments of the invention.

Various objects, features, aspects and advantages of the present embodiment will become more apparent from the following detailed description of embodiments of the embodiment, along with the accompanying drawings in which like numerals represent like components.

BRIEF DESCRIPTION OF THE DRAWINGS

The present disclosure may be better understood, and its numerous features and advantages made apparent and readily appreciated to those skilled in the art, by referencing the accompanying drawings.

FIG. 1 is a block diagram of a fluid transfer system in a first setting in accordance with some embodiments.

FIG. 2 is a block diagram of a fluid transfer system in a second setting in accordance with some embodiments.

FIG. 3 is a block diagram of a fluid transfer system in a third setting in accordance with some embodiments.

FIG. 4 is a block diagram of a fluid transfer system in a fourth setting in accordance with some embodiments.

FIG. 5 is a block diagram of a fluid transfer system in a fifth setting in accordance with some embodiments.

FIG. 6 is a block diagram of a fluid transfer system including a control system in accordance with some embodiments.

The same elements or parts throughout the figures of the drawings are designated by the same reference characters.

DETAILED DESCRIPTION OF THE INVENTION

The embodiment and various other embodiments can now be better understood by turning to the following detailed description of the embodiments, which are presented as illustrated examples of the embodiment defined in the claims. It is expressly understood that the embodiment as defined by the claims may be broader than the illustrated embodiments described below. Many alterations and modifications may be made by those having ordinary skill in the art without departing from the spirit and scope of the embodiments.

FIG. 1 is a block diagram of a fluid transfer system 100 in a first setting in accordance with some embodiments. The fluid transfer system 100 is employed to facilitate transfer of liquid from a container to a vehicle, not shown for clarity. Under conventional methods, a mechanic would have to exchange multiple tools to perform the same process. However, unlike prior devices and methods, the fluid transfer system 100 transfers coolant to the vehicle without having to disconnect and reconnect different tools to the vehicle. Thus, the fluid transfer system 100 improves efficiency and reduces overhead.

In some embodiments, the fluid transfer system 100 includes a first valve 110, a second valve 120, an air dispenser unit 130, a vacuum generator 140, a liquid container 150, a pressure regulator 160, a pressure gauge 170, a tee connector 180, and a waste container 190, but is not limited thereto. In the depicted example of FIG. 1, the first valve 110 includes four ports (i.e., a plurality of first valve ports 111-114). However, in different embodiments, the first valve 110 includes less than four ports or more than four ports (e.g., five ports, six ports, etc.). In other words, the first valve 110 facilitates movement of fluid (e.g., air, liquid) therethrough.

In some embodiments, the first valve 110 further includes a switch (not shown). However, in different embodiments, the switch is a button, a knob, a dial, a touchscreen display, a lever, and the like. Moreover, the first valve 110 opens and/or closes at least one of the plurality of first valve ports 111-114 in response to moving (i.e., rotating) the switch. In the depicted example of FIG. 1, a first input port 111 of the first valve 110 is open and a first output port 113 of the first valve 110 is open to facilitate movement of the air therethrough. Conversely, a second input port 112 and a second output port 114 are closed. In particular, the second input port 112 and the second output port 114 prevent movement of the air therethrough.

In the depicted example of FIG. 1, the second valve 120 includes five ports (i.e., a plurality of second valve ports 121-125). However, in different embodiments, the second valve 120 includes less than five ports or more than five ports (e.g., six ports, seven ports, etc.). In other words, the second valve 120 facilitates movement of fluid (e.g., air, liquid) therethrough. The second valve 120 is connected to the first valve 110. It will be appreciated that unless otherwise described, herein, connections between the first valve 110, the second valve 120, the air dispenser unit 130, the vacuum generator 140, the liquid container 150, the pressure regulator 160, the pressure gauge 170, the tee connector 180, and the waste container 190 includes hoses, pipes, wires, and the like.

In some embodiments, the second valve 120 further includes a switch (not shown). However, in different embodiments, the switch is a button, a knob, a dial, a touchscreen display, a lever, and the like. Moreover, the second valve 120 opens and/or closes at least one of the plurality of second valve ports 121-125 in response to moving (i.e., rotating) the switch. In the depicted example of FIG. 1, another first input port 121 of the second valve 120, another second input port 122, another first output port 123, another second output port 124, and a third output port 125 are closed to prevent movement of the air therethrough.

In the depicted example of FIG. 1, the fluid transfer system 100 is set to a first setting of operation, a pressure build-up setting. More specifically, the switch of the first valve 110 and the switch of the second valve 120 are both set to a first position (e.g., A-A). Additionally, the first valve 110 is connected to the air dispenser unit 130 at the first output port 113 and receives the air from the air dispenser unit 130. In some embodiments, the air dispenser unit 130 includes a compressed air source (a.k.a., shop air, compressed air tank), a pneumatic air device, a fan, and a blower, but is not limited thereto. The air dispenser unit 130 dispenses (i.e., blows) the air from a first outlet 131 toward the first output port 113. It is important to note that the air dispenser unit 130 is connected to the second output port 114, but the air is prevented from being received at the second output port 114 because it is closed in the first setting of operation. Moreover, in some embodiments, the air dispenser unit 130 dispenses compressed air without motorized components. Therefore, in some embodiments, the air dispenser unit 130 delivers the air at a steady pressure level based on the compressed air source.

In some embodiments, the pressure regulator 160 includes an air pressure regulator. In some embodiments, the pressure regulator 160 maintains an air pressure level to twenty pounds per square inch (20 psi). However, in different embodiments, the pressure regulator 160 is adjustable and the air pressure level is set to be less than 20 psi or greater than 20 psi. The pressure regulator 160 is connected between the first outlet 131 of the air dispenser unit 130 and the first output port 113 of the first valve 110. Accordingly, the pressure regulator 160 prevents fluctuations of the air pressure level of the air from the air dispenser unit 130 while moving through the first valve 110 toward the second valve 120.

The air from the air dispenser unit 130 moves through the pressure regulator 160 to the first valve 110. The air exits the first valve 110 through the first input port 111 toward the second valve 120. Also, the air passes through tee connector 180 and the pressure gauge 170, but stops at the another first output port 121 of the second valve 120 because the another first output port 121 is closed in the first setting of operation. However, the air passes through an opening of the tee connector 180 to an external connector 10. In various embodiments, the external connector 10 is a regulator cap that facilitates connection to a radiator of a vehicle. Moreover, the external connector 10 is a universal connector (i.e., connects to any vehicle) and/or is a plurality of external connectors 10, any of which connect to a specific type or brand of vehicle. As such, the fluid transfer system 100 is preferably operated while connected to a vehicle during coolant replacement.

FIG. 2 is a block diagram of a fluid transfer system 100 in a second setting in accordance with some embodiments. In the depicted example of FIG. 2, the fluid transfer system 100 is set to a second setting of operation, a pressure leak test setting. More specifically, the switch of the first valve 110 is set to a second position while the switch of the second valve 120 remains in the first position (e.g., B-A). The first output port 113 closes in response to switching the first valve 110 to the second position. However, the first input port 111 remains open.

In this manner, the pressure gauge 170 displays the air pressure level within the connection from the first valve 110 through the tee connector 180 and the pressure gauge 170 to the second valve 120, and the connection from the tee connector 180 to the external connector 10 on the vehicle (not shown). Accordingly, the pressure gauge 170 displays any changes (e.g., decreases, increases) in the air pressure level. To illustrate via an example, the pressure gauge 170 displays decreases in the air pressure level in response to loss of air within the radiator of the vehicle and/or any of the aforementioned connections. Thus, based on the decrease in the air pressure level, the fluid transfer system 100 has a pressure leak that must be repaired prior to extracting the liquid from the liquid container 150. Accordingly, repairs will be necessary before any coolant is replaced.

FIG. 3 is a block diagram of a fluid transfer system 100 in a third setting in accordance with some embodiments. In the depicted example of FIG. 3, the fluid transfer system 100 is set to a third setting of operation, a vacuum generation setting. More specifically, the switch of the first valve 110 is set to a third position while the switch of the second valve 120 is set to the second position (e.g., C-B). The output port 113 remains closed in response to switching the first valve 110 to the third position. However, the first input port 111 is closed while the second input port 112 and the second output port 114 are opened. Furthermore, the another first input port 121, the another second input port 122, the another first output port 123, and the third output port 125 of the second valve 120 are opened.

Accordingly, the air dispenser unit 130 dispenses the air from a second outlet 132 toward the second output port 114 of the first valve 110. The first valve 110 passes the air from the second output port 114 through the second input port 112 toward a first vacuum outlet 141. The vacuum generator 140 generates vacuum (i.e., draws air therein) in response to receiving the air from the air dispenser unit 130. Stated differently, the air dispenser unit 130 provides air power for the vacuum generator 140.

In some embodiments, the vacuum generator 140 includes a check valve 145, but is not limited thereto. The check valve 145 is a one-way valve that prevents movement of fluid (e.g., air, liquid) in two different directions. In the depicted example of FIG. 3, the vacuum generator 140 draws the air from the another first output port 123 through the check valve 145 at a second vacuum outlet 142 and into the vacuum generator 140. In the third setting of operation, the second valve 120 passes the air from the another first input port 121 to the another first output port 123. As such, the vacuum generator 140 draws the air from the radiator of the vehicle (not shown) through the external connector 10 into the tee connector 180 through the pressure gauge 170 into the another first input port 121. It is appreciated that the air moving into the tee connector 180 from the external connector 10 is also moving toward the first input port 111 of the first valve 110. However, as described above, the first input port 111 is closed in the third setting of operation.

While the vacuum generator 140 is drawing the air therein, any waste (e.g., debris, trash, dirt, etc.) generated and collected within the vacuum generator 140 is extracted (i.e., ejected) through a third vacuum outlet 143 toward the third output port 125 of the second valve 120. Additionally, the second valve 120 passes the waste from the third output port 125 to the another second input port 122 toward the waste container 190. Therefore, the waste container 190 stores the waste therein.

FIG. 4 is a block diagram of a fluid transfer system 100 in a fourth setting in accordance with some embodiments. In the depicted example of FIG. 4, the fluid transfer system 100 is set to a fourth setting of operation, a vacuum leak test setting. More specifically, the switch of the first valve 110 is set to the second position while the switch of the second valve 120 remains in the second position (e.g., B-B). The first input port 111 and the output port 113 remain closed in response to switching the first valve 110 to the second position. However, the second input port 112 and the second output port 114 are closed. Furthermore, the another first input port 121, the another second input port 122, the another first output port 123, and the third output port 125 of the second valve 120 remain opened.

Unlike in the third setting of operation, the air dispenser unit 130 is prevented from supplying the air to the vacuum generator 140 because the second output port 114 is closed. Accordingly, the vacuum generator 140 no longer extracts waste for collection in the waste container 190. However, the vacuum generator 140 continues to vacuum (i.e., draw the air) therein. As such, the vacuum generator 140 draws the air from the radiator of the vehicle (not shown) through the external connector 10 into the tee connector 180 through the pressure gauge 170 into the another first input port 121. Also, as described above with respect to the third setting of operation, the air moving into the tee connector 180 from the external connector 10 is also moving toward the first input port 111 of the first valve 110.

In this manner, the pressure gauge 170 displays a vacuum pressure level within the connection from the first valve 110 through the tee connector 180 to the external connector 10 on the vehicle (not shown). Additionally, the vacuum pressure level on the pressure gauge 170 is also based on the vacuum pressure level from the tee connector 180 through the pressure gauge 170 to the another first input port 121 of the second valve 120, and from the another first output port 123 to the vacuum generator 140. Accordingly, the pressure gauge 170 displays any changes (e.g., decreases, increases) in the vacuum pressure level. To illustrate via an example, the pressure gauge 170 displays decreases in the vacuum pressure level in response to loss of air within the radiator of the vehicle and/or any of the aforementioned connections.

Thus, based on the decrease in the vacuum pressure level, the fluid transfer system 100 has a vacuum leak that must be repaired prior to extracting the liquid from the liquid container 150. Accordingly, repairs will be necessary before any coolant is replaced.

FIG. 5 is a block diagram of a fluid transfer system 100 in a fifth setting in accordance with some embodiments. In the depicted example of FIG. 5, the fluid transfer system 100 is set to a fifth setting of operation, a refill setting. More specifically, the switch of the first valve 110 remains in the second position while the switch of the second valve 120 is set to the third position (e.g., B-C). The another second output port 124 is opened in response to switching the second valve 120 to the third position. However, the another first input port 121 remains opened. Furthermore, the second valve 120 passes the fluid from the another second output port 124 to the another first input port 121. Based on the vacuum pressure level within the second port 120, the vacuum generator 140 facilitates extraction of the liquid (e.g., coolant) from the liquid container 150 to move through the another second output port 124 through the another first input port 121 and into the external connector 10. As such, the liquid from the liquid container 150 is dispensed into the radiator of the vehicle (not shown).

As highlighted above, each of the settings of operations (i.e., first setting of operation, second setting of operation, etc.) are collectively, a plurality of settings of operations. Moreover, each of the plurality of settings of operations are based on settings (e.g., A, B, C) of the first valve 110 and the second valve 120.

FIG. 6 is a block diagram of a fluid transfer system 100 including a control system 200 in accordance with some embodiments. In the depicted example of FIG. 6, each of the aforementioned settings with respect to FIGS. 1-5 are illustrated as working simultaneously. However, in some embodiments, the fluid transfer system 100 is connected to a control system 200. In some embodiments, the control system 200 includes a desktop computer, a laptop computer, a smartphone, a tablet, a microphone, a keyboard, a game console, and the like. Therefore, in some embodiments, the control system 200 includes at least one processing unit (e.g., a central processing unit (CPU), a microprocessor, a microcontroller, a field programmable gate array (FPGA), an arithmetic logic unit (ALU), and the like) and at least one memory unit (e.g., non-volatile memory, volatile memory, random access memory (RAM), read-only memory (ROM), flash memory, solid state drive (SSD), and the like).

Referring to FIG. 6, the control system 200 includes a plurality of control units connected to the first valve 110, the second valve 120, and the air dispenser unit 130. However, in different embodiments, the control system 200 includes one or more control units connected to the vacuum generator 140, the liquid container 150, the pressure regulator 160, the pressure gauge 170, the tee connector 180, and/or the waste container 190. The control system 200 executes instructions, operations, or both based on a program to automate the different settings of operation described above with respect to FIGS. 1-5. In other words, the control system 200 automatically tests (e.g., by adjusting the switches, activating the air dispenser unit 130, and/or the vacuum generator 140) the air pressure level within the first valve 110, the second valve 120, and at the external connector 10. Moreover, the control system 200 automatically tests (e.g., by adjusting the switches, activating the air dispenser unit 130, and/or the vacuum generator 140) the vacuum pressure level within the first valve 110, the second valve 120, and at the external connector 10. In response to confirming the absence of a pressure leak or a vacuum leak based on the air pressure level and the vacuum pressure level, respectively, remaining steady, the control system 200 switches the first valve 110 and the second valve 120 to the fifth setting of operation to extract the liquid from the liquid container 150 via the vacuum and toward the external connector 10 and the radiator of the vehicle (not shown). Accordingly, the control system 200 automates the operations discussed above.

Alternatively, and/or, in addition thereto, in some embodiments, the control system 200 includes an artificial intelligence (AI) program that is trained based on data sets and/or prior implementation of the process to replace the coolant. Accordingly, the AI program on the control system 200 identifies errors and/or may send notifications to users, correct errors, and automate the operations discussed above.

The foregoing descriptions of specific implementations have been presented for purposes of illustration and description. They are not intended to be exhaustive or to limit the invention to the precise forms disclosed, and modifications and variations are possible in view of the above teaching. The exemplary implementations were chosen and described to best explain the principles of the invention and its practical application, to thereby enable others skilled in the art to best utilize the invention and its implementations with modifications as suited to the use contemplated.

It is therefore submitted that the invention has been shown and described in the most practical and exemplary implementations. It should be recognized that departures may be made which fall within the scope of the invention. With respect to the description provided herein, it is submitted that the optimal features of the invention include variations in size, materials, shape, form, function, manner of operation, assembly, and use. All structures, functions, and relationships equivalent or essentially equivalent to those disclosed are intended to be encompassed by the invention.

The invention claimed is:

1. A fluid transfer system, comprising:
    a liquid container to store a liquid therein;
    a first valve that facilitates movement of air therethrough;
    a second valve connected to the first valve and the liquid container to receive at least one of the liquid and the air therethrough;
    an air dispenser unit connected to the first valve and dispenses the air from a compressed air source toward the first valve;
    a vacuum generator connected to the first valve and the second valve, the vacuum generator to vacuum the air through the second valve, such that at least one first setting of operation of the first valve and the second valve tests for a pressure leak based on an air pressure level within the first valve, the second valve, and an external connector, at least one second setting of operation of the first valve and the second valve tests for a vacuum leak based on a vacuum pressure level of the air drawn from the external connector toward the first valve and the second valve, and at least one third setting of operation of the first valve and the second valve extracts the liquid from the liquid container toward the external connector; and
    a check valve connected to the second valve and the vacuum generator to restrict movement of the air from the second valve into the vacuum generator.

2. The fluid transfer system of claim 1, wherein the air dispenser unit at least partially dispenses the air to the vacuum generator and creates pressure for the vacuum generator.

3. The fluid transfer system of claim 2, wherein the vacuum generator generates vacuum based on the air received from the air dispenser.

4. The fluid transfer system of claim 1, further comprising a pressure regulator connected between the first valve and the air dispenser to regulate air pressure from the air dispenser.

5. The fluid transfer system of claim 1, further comprising a waste container connected to the second valve and stores waste generated and collected within the vacuum generator.

6. The fluid transfer system of claim 1, wherein the liquid is extracted from the liquid container through the second valve in response to drawing the air into the vacuum generator.

7. The fluid transfer system of claim 1, further comprising a pressure gauge connected to the first valve and the second valve to display the air pressure at the connection between the pressure gauge, the first valve, and the second valve.

8. The fluid transfer system of claim 7, further comprising a tee connector connected between the first valve and the second valve, the tee connector facilitates connecting the first valve and the second valve to the external connector.

9. The fluid transfer system of claim 1, further comprising a control unit connected to the first valve, the second valve, the air dispenser unit, and the vacuum generator to automatically test the air pressure level moving through the first valve and the second valve, and extract the liquid from the liquid container toward the external connector in response to the air pressure level remaining steady.

10. A method, comprising:
    storing a liquid within a liquid container;
    facilitating movement of air through a first valve;
    receiving at least one of the liquid and the air through a second valve connected to the first valve;
    dispensing the air from a compressed air source toward the first valve from an air dispenser;
    vacuuming, via a vacuum generator, the air through the second valve, such that at least one first setting of operation of the first valve and the second valve tests for a pressure leak based on an air pressure level within the first valve, the second valve, and an external connector, at least one second setting of operation of the first valve and the second valve tests for a vacuum leak based on a vacuum pressure level of the air drawn from the external connector toward the first valve and the second valve, and at least one third setting of operation of the first valve and the second valve extracts the liquid from the liquid container toward the external connector; and
    restricting, via a check valve, movement of the air from the second valve into the vacuum generator.

11. The method of claim 10, wherein dispensing the air toward the first valve comprises at least partially dispensing the air to the vacuum generator and creating pressure for the vacuum generator.

12. The method of claim 11, wherein vacuuming the air through the second valve comprises generating the vacuum based on the air received from the air dispenser.

13. The method of claim 10, further comprising:
    regulating, via a pressure regulator, air pressure from the air dispenser.

14. The method of claim 10, further comprising:
    selecting at least one setting of operation from a plurality of settings of operations based on at least one first setting of the first valve and at least one second setting of the second valve, such that the first valve has three settings and the second valve has three settings.

15. The method of claim 10, wherein extracting the liquid from the second valve comprises extracting the liquid from the liquid container through the second valve in response to drawing the air into the vacuum generator.

16. The method of claim 15, wherein extracting the liquid from the liquid container comprises:
   dispensing the liquid toward an external connector; and
   preventing the air from moving from the external connector to the vacuum generator.

17. The method of claim 10, further comprising:
   displaying, via a pressure gauge, the air pressure at the connection between the pressure gauge, the first valve, and the second valve.

18. The method of claim 17, further comprising:
   connecting, via a tee connector, the first valve and the second valve to an external connector.

\* \* \* \* \*